United States Patent
Lee

(10) Patent No.: US 7,243,503 B2
(45) Date of Patent: Jul. 17, 2007

(54) METHOD FOR CONTROLLING OPERATION OF AIR CONDITIONER

(75) Inventor: Won Hee Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 408 days.

(21) Appl. No.: 10/861,479

(22) Filed: Jun. 7, 2004

(65) Prior Publication Data
US 2005/0092004 A1 May 5, 2005

(30) Foreign Application Priority Data
Nov. 4, 2003 (KR) .................... 10-2003-0077612

(51) Int. Cl.
F25B 1/00 (2006.01)
F25B 49/00 (2006.01)
G05D 23/00 (2006.01)
(52) U.S. Cl. .................... 62/228.5; 62/229; 236/91 D
(58) Field of Classification Search .............. 62/228.5, 62/228.4, 229, 157; 236/91 D, 91 C, 91 R
See application file for complete search history.

(56) References Cited

U.S. PATENT DOCUMENTS 5,187,943 A    2/1993    Taniguchi et al.
5,588,589 A *  12/1996   Ishihara et al. ........... 236/46 R
5,678,758 A    10/1997   Takegawa et al.
2004/0098994 A1  5/2004  Lee
2004/0138784 A1  7/2004  Park et al.

FOREIGN PATENT DOCUMENTS

EP    1279901    1/2002

* cited by examiner

Primary Examiner—Chen-Wen Jiang
(74) Attorney, Agent, or Firm—Greenblum & Bernstein, P.L.C.

(57) ABSTRACT

A method for controlling an operation of an air conditioner having an inverter compressor and a regular velocity compressor includes: setting an upper limit threshold and a lower limit threshold based on a desired temperature set by a user, measuring a room temperature and comparing the measured room temperature and the set upper or lower limit threshold; and resetting the upper and lower limit thresholds based on a body adaptation time according to the comparison result, varying an operation frequency of a compressor and operating the compressor in the varied operation frequency for a predetermined time.

13 Claims, 4 Drawing Sheets

METHOD FOR CONTROLLING OPERATION OF AIR CONDITIONER

BACKGROUND OF THE INVENTION

1. Field of the Invention

The present invention relates to an air conditioner, and particularly, to a method for controlling an operation of an air conditioner having an inverter compressor and a regular velocity compressor.

2. Description of the Background Art

In general, an air conditioner controls a temperature, humidity, air current distribution of a certain space to be proper to a human activity and is an apparatus for cooling a room by using a principle of evaporation heat that heat is taken from the ambient when a refrigerant compressed at a high temperature and high pressure through various kinds of compressor is evaporated. Here, liquid that is easily evaporated even at a low temperature is used as the refrigerant, and generally, Freon gas is used.

FIG. 1 is a block diagram showing a schematic structure of an air conditioner in accordance with the conventional art.

As shown therein, an air conditioner in accordance with the conventional art includes: a control unit 10 measuring a room temperature and outputting a control signal for controlling cooling capacity based on the measured temperature and a preset temperature; a compressor unit 20 compressing a refrigerant based on the control signal; a condenser 30 condensing the refrigerant compressed by the compressor unit 20; a expansion valve 40 for expanding the refrigerant condensed by the condenser 30; and an evaporator 50 evaporating the refrigerant expanded by the expansion valve 40.

An operation principle of the air conditioner according to the conventional art constructed as above will now be described in detail.

First, the control unit 10 measures a room temperature and outputs a control signal for controlling a cooling capacity based on the measured room temperature and a temperature preset by a user.

In the compressor unit 20, an inverter compressor, a first compressor 21 is used as a small capacity compressor, and a regular velocity compressor, a second compressor 22 is used as a large capacity compressor. The first and second compressors 21 and 22 are selectively driven according to the control signal, thereby compressing the refrigerant at a high temperature and high pressure. Namely, the compressor unit 20 is driven in a mode that only the first compressor is driven, a mode that only the second compressor is driven, or a mode that both first and second compressors are driven, to thereby vary a compressing capacity of a refrigerant required for cooling.

Here, a control range of a cooling capacity is varied depending on kinds of first and second compressors, and the first and second compressors are largely divided to the regular velocity compressor and the inverter compressor. In case of the regular velocity compressor, since the compressor has a constant operation speed, a room temperature is controlled by turning on/off the compressor. However, in case of the inverter compressor, since the compressor controls its operation speed, a room temperature can be relatively precisely controlled by controlling its operation frequency For example, assuming that the first compressor 21 is a regular velocity compressor having a compressing capacity of 30, and the second compressor 22 is a regular velocity compressor having a compressing capacity of 40, an air conditioner to which the first and second compressors are applied can control a room temperature with a compressing capacity of 30, 40 or 70.

However, assuming that the first compressor 21 is an inverter compressor having a compressing capacity of 30, and the second compressor 22 is a regular velocity compressor having a compressing capacity of 40, the air conditioner to which the first and second compressors are applied can relatively precisely controls a room temperature with a compressing capacity of 10, 20, 30, 40, 50 60 or 70. Here, in general, the inverter compressor controls the compressing capacity by the unit of 10.

The condenser 30 condenses a refrigerant compressed at a high temperature and high pressure by the compressor unit 20, and the expansion valve 40 expands the condensed refrigerant. In addition, the evaporator 50 evaporates the expanded refrigerant and takes heat from around the evaporator 50, so that heat exchange which drops a temperature of air coming in contact with a surface of the evaporator 50 is performed.

In the air conditioner in accordance with the conventional art, a regular velocity compressor and an inverter compressor are used as compressors used to control a cooling capacity, so that the cooling capacity can be precisely controlled according to a cooling load. A change of a room temperature according to the air conditioner driven in such a manner will now be described with reference to FIG. 2.

FIG. 2 is a graph showing a change of a room temperature due to a method for controlling an operation of an air conditioner in accordance with the conventional art.

As shown therein, when a room temperature reaches an upper limit temperature or a lower limit temperature of a desired temperature set by a user, the regular velocity compressor is turned on/off or an operation frequency of the inverter compressor is controlled, so that the room temperature is controlled within a certain range.

However, the air conditioner in accordance with the conventional art is disadvantageous in that when a desired temperature set by a user is maintained for a long time, a user feels cold and thus cannot feel pleasantness at the desired temperature set by himself/herself.

SUMMARY OF THE INVENTION

Therefore, an object of the present invention is to provide a method for controlling an operation of an air conditioner capable of improving a power saving function of a product by comparing an upper or lower limit threshold determined based on a desired temperature set by a user to a room temperature, resetting the upper and lower limit thresholds based on the comparison result and a body adaptation time and varying an operation frequency of a compressor as much as a predetermined level.

Another object of the present invention is to provide a method for controlling an operation of an air conditioner capable of improving pleasantness of a user by comparing an upper or lower limit threshold determined based on a desired temperature set by a user to a room temperature, resetting the upper and lower limit thresholds based on the comparison result and a body adaptation time and varying an operation frequency of a compressor as much as a predetermined level.

To achieve these and other advantages and in accordance with the purpose of the present invention, as embodied and broadly described herein, there is provided a method for controlling an operation of an air conditioner comprising: determining an upper limit threshold and a lower limit threshold based on a desired temperature set by a user, measuring a room temperature and comparing the measured room temperature to the set upper or lower limit threshold; and resetting the upper and lower limit thresholds based on the comparison result according to a body adaptation time, varying an operation frequency of a compressor as much as a predetermined level, and operating a compressor in the varied operation frequency of the compressor for a predetermined time To achieve these and other advantages and in accordance with the purpose of the present invention, as embodied and broadly described herein, there is provided a method for controlling an operation of an air conditioner comprising: a first step of setting an upper limit threshold and a lower limit threshold based on a desired temperature set by a user, measuring a room temperature, decreasing an operation frequency of a compressor as much as a predetermined level when the measured room temperature is lower than the set lower limit threshold, and operating the compressor in the decreased operation frequency of the compressor for a predetermined time; a second step of measuring a room temperature after the predetermined time elapses, adding a predetermined value to the upper and lower limit thresholds when the measured room temperature is higher than the set upper limit threshold and a body adaptation time elapses, increasing the operation frequency of the compressor as much as a predetermined level, and operating the compressor in the increased operation frequency of the compressor for a predetermined time; a third step of measuring a room temperature after the predetermined time elapses, adding the predetermined value to the upper and lower limit thresholds when the measured room temperature is lower than the lower limit threshold and the body adaptation time elapses, decreasing the operation frequency of the compressor as much as a predetermined level, operating the compressor in the decreased operation frequency of the compressor for a predetermined time, and circulating to the second step.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a unit of this specification, illustrate embodiments of the invention and together with the description serve to explain the principles of the invention.

In the drawings.

DETAILED DESCRIPTION OF THE PREFERRED EMBODIMENTS

Hereinafter, preferred embodiments of a method for controlling an operation of an air conditioner in accordance with the present invention capable of improving a power saving function of a product and improving pleasantness of a user by comparing an upper or lower limit threshold determined based on a desired temperature set by a user to a room temperature, resetting the upper and lower limit thresholds based on the comparison result and a body adaptation time and varying an operation frequency of a compressor as much as a predetermined level, will now be described with reference to accompanying drawings.

Figure 1:
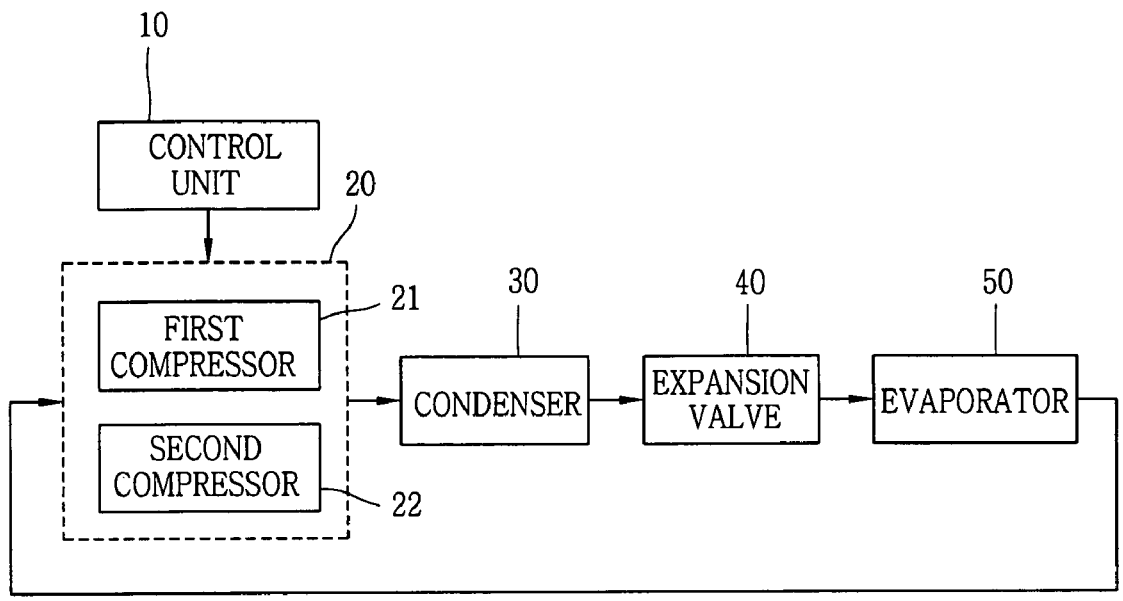
FIG. 1 is a block diagram showing a schematic structure of an air conditioner in accordance with the conventional art.
Figure 2:
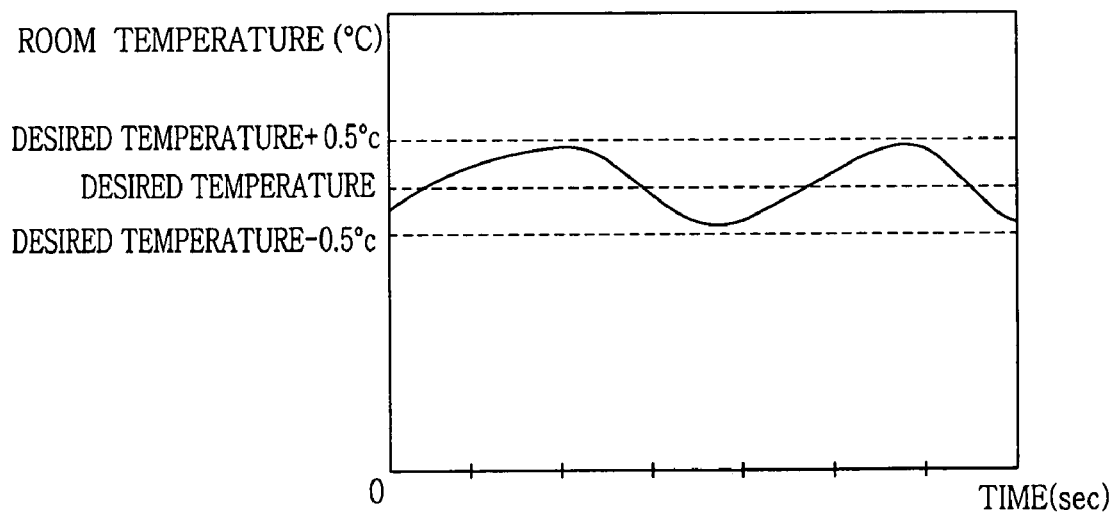
FIG. 2 is a graph showing a change of a room temperature due to a method for controlling an operation of an air conditioner in accordance with the conventional art.
Figure 3A:
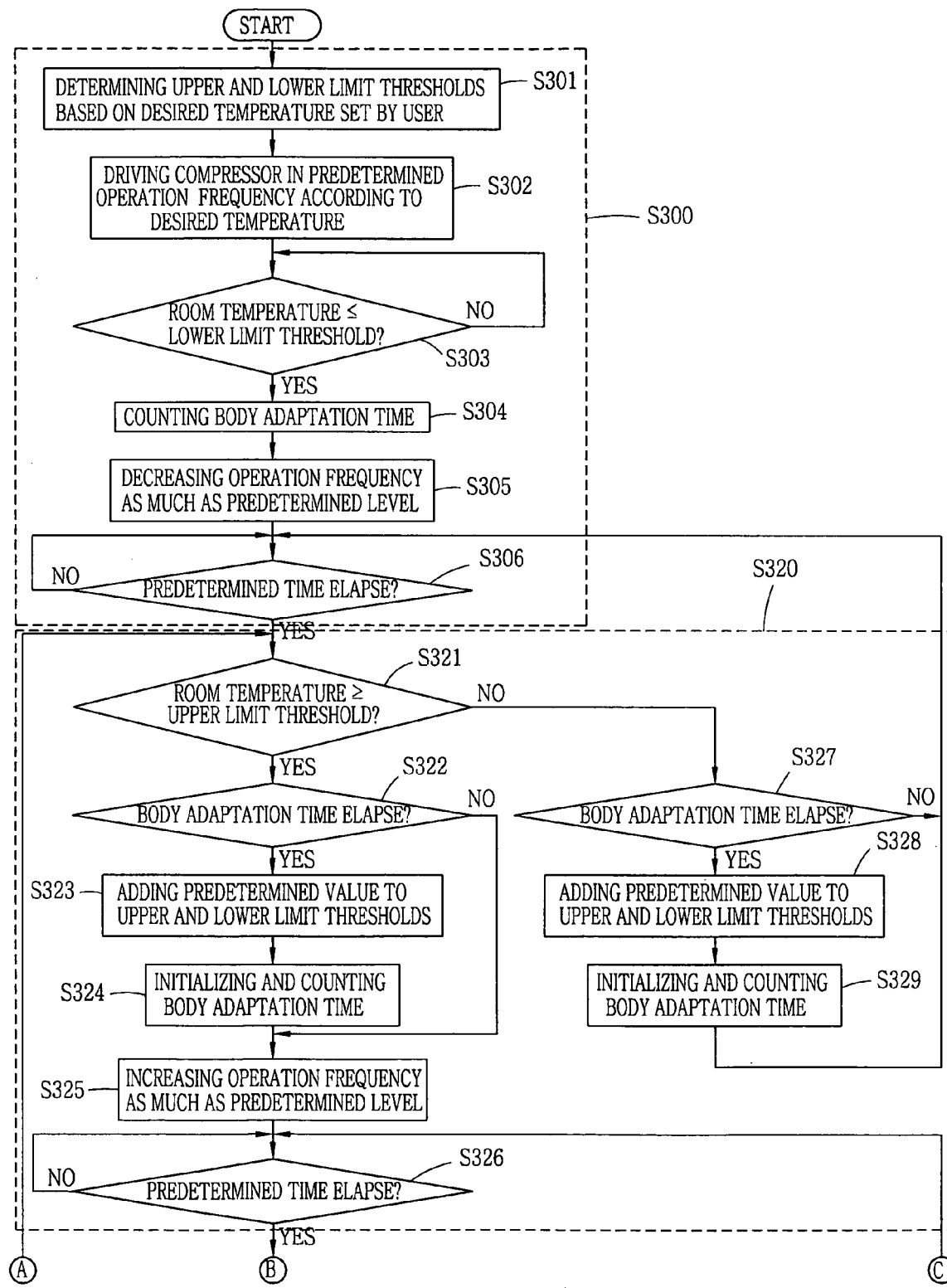
FIGS. 3A and 3B are a flow chart showing a method for controlling an operation of an air conditioner in accordance with the present invention.
Figure 3B:
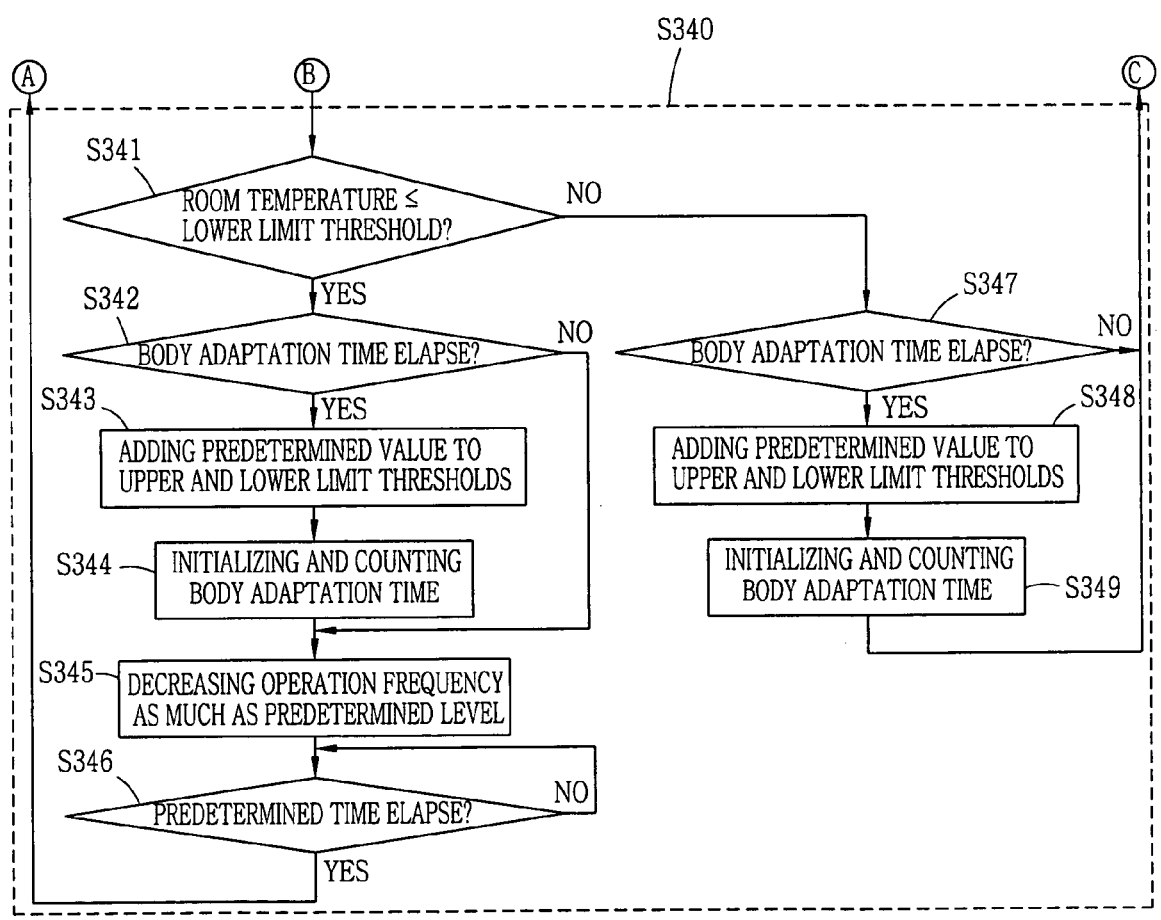

FIGS. 3A and 3B are a flow chart showing a method for controlling an operation of an air conditioner in accordance with the present invention.

As shown therein, a method for controlling an operation of an air conditioner in accordance with the present invention includes: a first step (S300) of determining an upper limit threshold and a lower limit threshold based on a desired temperature set by a user, decreasing an operation frequency of a compressor as much as a predetermined level when a room temperature is lower than the determined lower limit threshold, and operating the compressor in the decreased operation frequency of the compressor for a predetermined time; a second step (S320) of adding a predetermined value to the upper and lower limit thresholds when the room temperature is higher than the set upper limit threshold and a body adaptation time elapses after the predetermined time elapses, increasing the operation frequency of the compressor as much as a predetermined level and operating the compressor in the increased operation frequency of the compressor for a predetermined time; and a third step (S340) of adding the predetermined value to the upper and lower limit thresholds when a room temperature is lower than the lower limit threshold and the body adaptation time elapses after the predetermined time elapses, decreasing the operation frequency of the compressor as much as a predetermined level, operating the compressor in the decreased operation frequency of the compressor for a predetermined time, and circulating to the second step.

The method for controlling an operation of the air conditioner in accordance with the present invention constructed as above will now be described in detail.

First, when a user set a desired temperature, the air conditioner determines upper and lower limit thresholds based on the desired temperature (S301) and is driven in a predetermined operation frequency of a compressor according to the desired temperature (S302). Here, the upper and lower limit thresholds mean preset upper and lower limit ranges of the desired temperature, and for example, when the desired temperature is 24° C., the upper limit threshold may be determined to be 24.5° C., and the lower limit threshold may be determined to be 23.5° C.

The air conditioner measures a room temperature and compares the measured room temperature to the determined lower limit threshold (S303). Here, when the room temperature is higher than the lower limit threshold, the air conditioner is driven in the predetermined operation frequency of the compressor for a predetermined time (S302). When the room temperature is lower than the lower limit threshold, the air conditioner counts the body adaptation time (S304), then decreases the predetermined operation frequency of the compressor as much as a predetermined level (S305) and is driven in the decreased operation frequency of the compressor for a predetermined time (S306).

Next, the air conditioner measures a room temperature after the predetermined time elapses, compares the measured room temperature and the upper limit threshold (S321) and determines whether the body adaptation time elapses (S322, S327). Here, when the room temperature is higher than the upper threshold and the body adaptation time elapses, the air conditioner adds a predetermined value to the upper and lower limit thresholds (S323), initializes and counts the body adaptation time (S324), increases an operation frequency of the compressor as much as a predetermined level (S325) and is driven in the increased operation frequency of the compressor for a predetermined time (S326). When the measured room temperature is higher than the upper limit threshold and the body adaptation time does not elapse, the air conditioner increases the operation frequency of the compressor as much as a predetermined level (S325) and is driven in the increased operation frequency of the compressor for a predetermined time (S326).

Here, the body adaptation time is a lapse time until before a skin temperature of human drops to 32.5° C. or lower when a room temperature is maintained within a certain temperature range. For the body adaptation time, the pleasantness of a user is maintained, and this is because an optical skin temperature that a person generally feels pleasantness is 32.5° C.~34° C.

As an example of a result of experimentally measuring such a body adaptation time, the body adaptation time was about 15 minutes at a room temperature of 24° C. or lower, about 30 minutes at a room temperature of 25° C., and about 60 minutes at a room temperature of 26° C. Accordingly, it can be known that as a room temperature become higher, the body adaptation time is lengthened.

On the contrary, when the room temperature is lower than the upper limit threshold and the body adaptation time elapses, the air conditioner adds a predetermined value to the upper and lower limit thresholds (S328), initializes and counts the body adaptation time (S329) and is driven in a current operation frequency of the compressor for a predetermined time (S306). When the room temperature is lower than the upper limit threshold and the body adaptation time does not elapse, the air conditioner is driven in the current operation frequency of the compressor for a predetermined time (S306). Here, preferably, the predetermined value is generally set to be 0.5° C.

Next, after the predetermined time elapses, the air conditioner measures a room temperature, compares the measured room temperature and the lower limit threshold (S341) and determines whether the body adaptation time elapses (S342, S347). Here, when the room temperature is lower than the lower limit threshold and the body adaptation time elapses, the air conditioner adds a predetermined value to the upper and lower limit thresholds (S343), initializes and counts the body adaptation time (S344), then decreases the operation frequency of the compressor as much as a predetermined level (S345) and is driven in the decreased operation frequency of the compressor for a predetermined time (S346). When the room temperature is lower than the lower limit threshold and the body adaptation time does not elapse, the air conditioner decreases the operation frequency of the compressor as much as a predetermined level (S345) and is driven in the decreased operation frequency of the compressor for a predetermined time (S346).

Here, the air conditioner is driven in the decreased operation frequency of the compressor for a predetermined time (S346), and then, the step is circulated to a step of measuring a room temperature and comparing the measured room temperature and the upper limit threshold (S321).

On the contrary, when the room temperature is higher than the lower limit threshold and the body adaptation time elapses, the air conditioner adds a predetermined value to the upper and lower limit thresholds (S348), initializes and counts the body adaptation time (S349) and is driven in a current operation frequency of the compressor for a predetermined time (S326). When the room temperature is higher than the lower limit threshold and the body adaptation time does not elapse, the air conditioner is driven in the current operation frequency of the compressor for a predetermined time (S327).

A result of experimentally measuring a skin temperature that is changed by the method for controlling an operation of an air conditioner in accordance with the present invention will now be described with reference to FIG. 4.

Figure 4:
FIG. 4 is a graph showing a change of a skin temperature due to a method for controlling an operation of an air conditioner in accordance with the present invention.

FIG. 4 is a graph showing a skin temperature change due to a method for controlling an operation of an air conditioner in accordance with the present invention.

As shown therein, the method for controlling an operation of the air conditioner in accordance with the present invention continuously maintains a user skin temperature (A) of 32.5° C.~34° C., thereby improving pleasantness of a user and also improving a power saving function of a product.

However, in the method for controlling an operation of an air conditioner in accordance with the conventional art, since a room temperature is controlled so as to be only within a certain range of a desired temperature set by a user, a skin temperature (B) of a user is continuously decreased.

As so far described in detail, in a method for controlling an operation of an air conditioner, an upper or lower limit threshold determined based on a desired temperature set by a user is compared to a room temperature, the upper and lower limit thresholds are reset based on the comparison result and a body adaptation time, and an operation frequency of the compressor is varied as much as a predetermined level, thereby improving a power saving function of a product.

In addition, in the method for controlling an operation of an air conditioner in accordance with the present invention, an upper or lower limit threshold determined based on a desired temperature set by a user is compared to a room temperature, the upper and lower limit thresholds are reset based on the comparison result and the body adaptation time, and an operation frequency of the compressor is varied as much as a predetermined level, thereby improving pleasantness.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A method for controlling an operation of an air conditioner comprising:
    setting an upper limit threshold and a lower limit threshold based on a desired temperature set by a user, measuring a room temperature and comparing the measured room temperature and the set upper or lower limit threshold; and
    resetting the upper and lower limit thresholds based on the comparison result, when a body adaptation time elapses, varying an operation frequency of a compressor by as much as a predetermined level, and operating a compressor in the varied operation frequency of the compressor for a predetermined time.

2. The method of claim 1, wherein the upper and lower limit thresholds are upper and lower limit ranges of a desired temperature set by the user.

3. The method of claim 2, wherein the upper and lower limit thresholds are reset by adding a predetermined value thereto.

4. The method of claim 1, wherein the body adaptation time is a predetermined lapse time until before a human skin temperature drops to 32.5° C. or lower when a room temperature is maintained within a certain temperature range.

5. A method for controlling an operation of an air conditioner comprising:
   a first step of setting an upper limit threshold and a lower limit threshold based on a desired temperature set by a user, measuring a room temperature, decreasing an operation frequency of a compressor as much as a predetermined level when the measured room temperature is lower than the set lower limit threshold, and operating the compressor in the decreased operation frequency of the compressor for a predetermined time;
   a second step of measuring a room temperature after the predetermined time elapses, adding a predetermined value to the upper and lower limit thresholds when the measured room temperature is higher than the set upper limit threshold and a body adaptation time elapses, increasing the operation frequency of the compressor as much as a predetermined level, and operating the compressor in the increased operation frequency of the compressor for a predetermined time;
   a third step of measuring a room temperature after the predetermined time elapses, adding the predetermined value to the upper and lower limit thresholds when the measured room temperature is lower than the lower limit threshold and the body adaptation time elapses, decreasing the operation frequency of the compressor as much as the predetermined level, operating the compressor in the decreased operation frequency of the compressor for a predetermined time, and circulating to the second step.

6. The method of claim 5, wherein the second step comprises:
   adding a predetermined value to the upper and lower limit thresholds when the room temperature is higher than the upper limit threshold and the body adaptation time elapses, initializing and counting the body adaptation time, increasing the operation frequency of the compressor as much as a predetermined level, and operating the compressor in the increased operation frequency of the compressor for a predetermined time;
   increasing the operation frequency of the compressor as much as a predetermined level when the room temperature is higher than the upper limit threshold and the body adaptation time does not elapse, and operating the compressor in the increased operation frequency of the compressor.

7. The method of claim 5, wherein the second step comprises:
   adding a predetermined value to the upper and lower limit thresholds when the room temperature is lower than the upper limit threshold and the body adaptation time elapses, initializing and counting the body adaptation time, and operating the compressor in the current operation frequency of the compressor for a predetermined time; and
   operating the compressor in the current operation frequency of the compressor for a predetermined time when the room temperature is lower than the upper limit threshold, and the body adaptation time does not elapse.

8. The method of claim 5, wherein the third step comprises:
   adding a predetermined value to the upper and lower limit thresholds when the room temperature is lower than the lower limit threshold and the body adaptation time elapses, initializing and counting the body adaptation time, decreasing the operation frequency of the compressor as much as a predetermined level, and operating the compressor in the decreased operation frequency of the compressor for a predetermined time; and
   decreasing the operation frequency of the compressor as much as a predetermined level when the room temperature is lower than the lower limit threshold and the body adaptation time does not elapse, and operating the compressor in the decreased operation frequency of the compressor for a predetermined time.

9. The method of claim 5, wherein the third step comprises:
   adding a predetermined value to the upper and lower limit thresholds when the room temperature is higher than the lower limit threshold and the body adaptation time elapses, initializing and counting the body adaptation time, and operating the compressor in the current operation frequency of the compressor for a predetermined time; and
   operating the compressor in the current operation frequency of the compressor for a predetermined time when the room temperature is higher than the lower limit threshold and the body adaptation time does not elapse.

10. The method of claim 5, wherein the upper and lower limit thresholds are upper and lower limit ranges of a desired temperature set by a user.

11. The method of claim 10, wherein the upper and lower limit thresholds are reset by adding a predetermined value thereto.

12. The method of claim 11, wherein the predetermined value is set to be 0.5° C.

13. The method of claim 11, the body adaptation time is a predetermined lapse time until before a human skin temperature drops to 32.5° C. or lower when the room temperature is maintained within a certain temperature range.

* * * * *